United States Patent
Tovey et al.

(10) Patent No.: US 11,164,127 B2
(45) Date of Patent: Nov. 2, 2021

(54) SYSTEM AND METHOD FOR ON-SITE PURCHASES AT AUTOMATED STORAGE AND RETRIEVAL SYSTEM

(71) Applicant: Walmart Apollo, LLC, Bentonville, AR (US)

(72) Inventors: David Tovey, Rogers, AR (US); Todd Mattingly, Bentonville, AR (US); Edward Hernandez, Bentonville, AR (US); Trent Miller, Bentonville, AR (US); Kurt W. R. Bessel, Mexico, NY (US); Bruce Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/386,876

(22) Filed: Apr. 17, 2019

(65) Prior Publication Data
US 2019/0325367 A1    Oct. 24, 2019

Related U.S. Application Data

(60) Provisional application No. 62/659,986, filed on Apr. 19, 2018.

(51) Int. Cl.
*G06Q 10/06* (2012.01)
*G06Q 30/02* (2012.01)
(Continued)

(52) U.S. Cl.
CPC ....... *G06Q 10/06315* (2013.01); *G06Q 20/12* (2013.01); *G06Q 30/0201* (2013.01); *G06Q 30/0635* (2013.01)

(58) Field of Classification Search
CPC ............. G06Q 10/06315; G06Q 20/12; G06Q 30/0201; G06Q 30/0635
See application file for complete search history.

(56) References Cited

U.S. PATENT DOCUMENTS 7,206,753 B2   4/2007   Bancroft et al.
8,065,353 B2   11/2011  Eckhoff et al.
(Continued)

FOREIGN PATENT DOCUMENTS

WO    WO-2014165439 A2 * 10/2014 ............. G06Q 10/08
WO       2017187251 A1    11/2017

OTHER PUBLICATIONS

K. O'Hara and M. Perry, "User centred opportunities for supporting consumer behaviour through handheld and ubiquitous computing," 36th Annual Hawaii International Conference on System Sciences, 2003. Proceedings of the, 2003, pp. 9 pp.-, doi: 10.1109/HICSS.2003.1174833. (Year: 2003).*

(Continued)

*Primary Examiner* — Matthew S Gart
*Assistant Examiner* — Tiera J Fletcher
(74) *Attorney, Agent, or Firm* — Duane Morris LLP; Manita Rawat

(57) ABSTRACT

A method for an on-site purchase at an automated storage and retrieval system (ASRS) can include: analyzing likely impulse purchases for customers during a given season, the likely impulse purchases being associated with each customer's profile which comprises preferences, purchase history and search history; stocking items for customers to purchase and pick up at the ASRS, the stocked items comprising general and seasonal items, and supplementary items selected based on an analysis of the likely impulse purchases; receiving a customer's order for purchasing an item; detecting a customer's arrival within a predetermined area around the ASRS; offering a subset of the stocked items (Continued)

for the customer to add to the order, updating the order based on customer's purchase selections or declines; completing a payment transaction of the updated order; automatically updating the items for inclusion in the ASRS based on the customer purchase selections or declines.

19 Claims, 3 Drawing Sheets

(51) Int. Cl.
  *G06Q 30/06* (2012.01)
  *G06Q 20/12* (2012.01)

(56) References Cited

U.S. PATENT DOCUMENTS

| | | | |
|---|---|---|---|
| 8,583,511 B2 | 11/2013 | Hendrickson | |
| 9,087,178 B2 | 7/2015 | Lowe et al. | |
| 9,400,994 B2 | 7/2016 | Cancro et al. | |
| 9,483,790 B2 | 11/2016 | Marshall et al. | |
| 2004/0177008 A1 | 9/2004 | Yang | |
| 2010/0036670 A1 | 2/2010 | Hill et al. | |
| 2013/0282437 A1 | 10/2013 | Cooke et al. | |
| 2014/0039998 A1* | 2/2014 | Hancock | G06Q 30/06 705/14.23 |
| 2014/0214562 A1* | 7/2014 | Cancro | G06Q 30/0631 705/16 |
| 2015/0348146 A1 | 12/2015 | Shanmugam et al. | |
| 2016/0098742 A1 | 4/2016 | Minicucci et al. | |
| 2016/0162912 A1 | 6/2016 | Garel et al. | |
| 2017/0178153 A1 | 6/2017 | Meng et al. | |

OTHER PUBLICATIONS

International Search Report and Written Opinion dated Jul. 3, 2019, issued in corresponding PCT Application No. PCT/US2019/027834.

* cited by examiner

SYSTEM AND METHOD FOR ON-SITE PURCHASES AT AUTOMATED STORAGE AND RETRIEVAL SYSTEM

CROSS REFERENCE TO RELATED APPLICATION

This patent application claims the benefit of U.S. Provisional Application No. 62/659,986, filed on Apr. 19, 2018, content of which is incorporated by reference herein.

BACKGROUND

1. Technical Field

The present disclosure relates to on-site purchases at an automated storage and retrieval system (ASRS), and more specifically to systems and methods for customers' on-site purchases at an ASRS.

2. Introduction

An ASRS allows customers to place orders via a merchant's website and pick up their orders quickly. As customers arrive at an ASRS to pick up their orders, they may be offered the opportunity to purchase additional items which are already stocked in the ASRS. In some cases, the customers may quickly update their orders when they see some items they are previously interested in are available to be added into their shopping carts for purchase. Therefore, it is very important to determine which items are pre-stocked at an ASRS based on a customer's personal needs and preferences. Accordingly, additional improvements are required for an existing ASRS to pre-stock items for facilitating impulse purchases for customers. This may help to avoid merchant's sale losses and to provide customers a seamless purchase experience with a merchant's ASRS.

What is provided herein are systems and methods for on-site purchases at an ASRS, which may overcome some disadvantages of an existing ASRS.

SUMMARY

An example method of performing concepts disclosed herein can include: analyzing, by a processor at a merchant's ASRS management platform, likely impulse purchases for a plurality of customers during a given season in an area, the likely impulse purchases being associated with each customer's profile which comprises preferences, purchase history and search history via a merchant's website; securely stocking items for the plurality of the customers to purchase and pick up at the merchant's ASRS, the stocked items comprising: a wide variety of general and seasonal items, and supplementary items selected by the processor based on an analysis of the likely impulse purchases; receiving, by the processor, a first order from one of the plurality of the customers for purchasing a first item stocked at the ASRS; issuing, by the processor, a confirmation code to the customer via a text or an email for picking up the first order; detecting, by a geolocation module in a central server, the customer's arrival within a predetermined area associated with the ASRS; generating, by the processor, a subset of stocked items based on an analysis of a likely impulse purchase for the customer; verifying the customer's arrival at the ASRS; displaying the subset of the stocked items on the interactive touchscreen terminal for the customer to select, updating by the processor the first order based on purchase selections or declines by the customer; completing a payment transaction of the updated first order; automatically retrieving the updated first order from the ASRS to the customer; and automatically, by the central server, updating the items for inclusion in the ASRS based on the purchase selections or declines by the customer.

An example system configured according to the concepts and principles disclosed herein can include: an ASRS; a processor; a non-transitory computer-readable storage medium having instructions stored which, when executed by the processor, cause the processor to perform operations comprising: analyzing, by a processor at a merchant's ASRS management platform, likely impulse purchases for a plurality of customers during a given season in an area, the likely impulse purchases being associated with each customer's profile which comprises preferences, purchase history and search history via a merchant's website; securely stocking items for the plurality of the customers to purchase and pick up at a merchant's ASRS, the stocked items comprising: a wide variety of general and seasonal items, and supplementary items selected by the processor based on an analysis of the likely impulse purchases; receiving, by the processor, a first order from one of the plurality of the customers for purchasing a first item stocked at the ASRS; issuing, by the processor, a confirmation code to the customer via a text or an email for picking up the first order; detecting, by a geolocation module in a central server, the customer's arrival within a predetermined area associated with the ASRS; generating, by the processor, a subset of stocked items based on an analysis of a likely impulse purchase for the customer; verifying the customer's arrival at the ASRS; displaying the subset of the stocked items on the interactive touchscreen terminal for the customer to select, updating, by the processor, the first order based on purchase selections or declines by the customer; completing a payment transaction of the updated first order; automatically retrieving the updated first order from the ASRS to the customer; and automatically, by the central server, updating the items for inclusion in the ASRS based on the purchase selections or declines by the customer.

An example non-transitory computer-readable storage medium configured as disclosed herein can have instructions stored which, when executed by a computing device, cause the computing device to perform operations including: analyzing, by a processor at a merchant's ASRS management platform, likely impulse purchases for a plurality of customers during a given season in an area, the likely impulse purchases being associated with each customer's profile which comprises preferences, purchase history and search history via a merchant's website; securely stocking items for the plurality of the customers to purchase and pick up at a merchant's ASRS, the stocked items comprising: a wide variety of general and seasonal items, and supplementary items selected by the processor based on an analysis of the likely impulse purchases; receiving, by the processor, a first order from one of the plurality of the customers for purchasing a first item stocked at the ASRS; issuing, by the processor, a confirmation code to the customer via a text or an email for picking up the first order; detecting, by a geolocation module in a central server, the customer's arrival within a predetermined area associated with the ASRS; generating, by the processor, a subset of stocked items based on an analysis of a likely impulse purchase for the customer; verifying the customer's arrival at the ASRS; displaying the subset of the stocked items on the interactive touchscreen terminal for the customer to select, updating by the processor the first order based on purchase selections or declines by the customer; completing a payment transaction of the updated first order; automatically retrieving the updated first order from the ASRS to the customer; and automatically, by the central server, updating the items for inclusion in the ASRS based on the purchase selections or declines by the customer.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
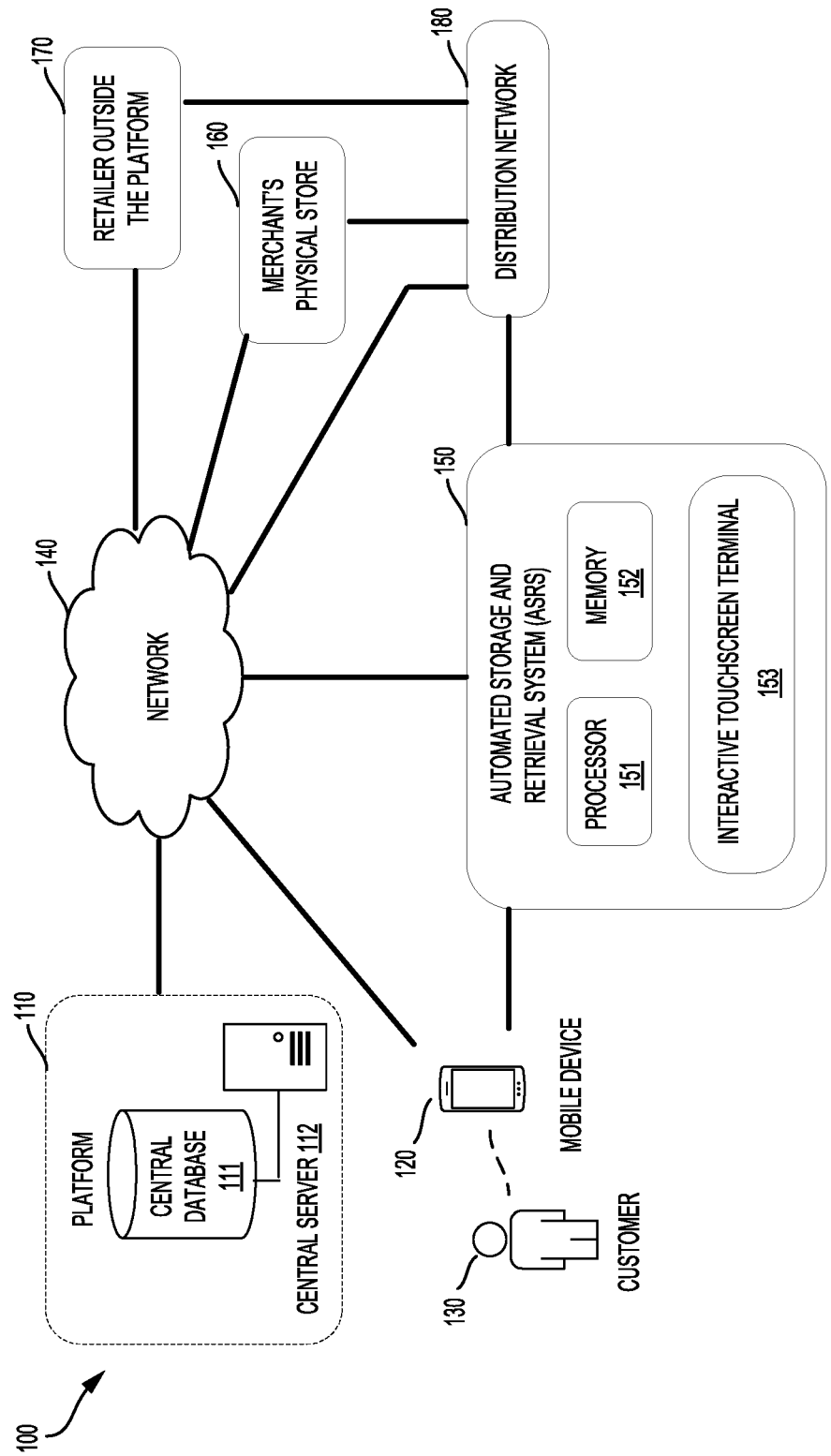
FIG. 1 is a block diagram illustrating an example computing environment in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

Systems, methods, and computer-readable storage media provided in this disclosure are capable of enabling customers to buy additional items while picking up their orders at a merchant's ASRS. The contents of a portion of the items stocked in an ASRS may be modified by considering customers' preferences, order history and searching history, which further facilitates on-site impulse purchases with respect to seasonal items, gift cards, gift wrap, birthday items, etc.

In some example embodiments of this disclosure, the disclosed systems and methods may select items to be pre-stocked at an ASRS based on an analysis of a customer's profile. The customer's profile may include items associated with the customer's personal preferences, search history on a merchant's website, and order history. These items may be stocked at the ASRS before the customer picks up an order. For example, when the customer arrives at the ASRS for picking up an order, items the customer has been considering to buy may be displayed or offered to the customer. Since the items are already stocked in the ASRS, the customer may combine them with pre-ordered items and complete a purchase transaction quickly. These features may greatly enhance the customer's purchasing experiences, reduce time for the customer to search items, and maximize customer satisfaction with the merchant's ASRS services.

The systems and methods implemented at ASRS in this disclosure may be feasible in in multiple hardware facilities including towers, kiosks, etc.

FIG. 1 is a block diagram illustrating an example computing environment 100 in which some example embodiments may be implemented. The example computing environment 100 generally includes one or more of platform 110, customer mobile device 120, customer 130, network 140, ASRS 150, merchant's physical store 160, retailer 170 outside merchant's management platform, and distribution network 180. A platform 110 may communicate with a merchant's website, a plurality of ASRSs as well as one or more merchant's retail store systems to fulfil orders for one or more products and services. In this case, customer 130 may place an online order of one or more items via the merchant's website for pickup at one of a plurality of ASRS 150. In some example embodiments, customer mobile device 120 may be represented as a mobile phone, a tablet computer, a notebook computer, or a desktop computer that is communicatively coupled to network 140 to allow customer 130 to communicate, access information and place orders via network 140.

Network 140 may include wired and/or wireless networks that enable communications between the various networked devices associated with example computing environment 100, such as customer mobile device 120, central server 112, ASRS 150, merchant's physical store 160, retailer outside merchant's platform 170, and distribution network 180.

As shown in FIG. 1, ASRS 150 operated by platform 110 may be located in parking lots close to merchant's physical stores 160, inside stores 160, at local parks, arenas, airports, rock concerts, supercenters, shopping malls, nearby the beach, or anywhere with a density of shopper or other public or private places.

In the example computing environment 100, platform 110 may include one or more servers, shown and referred to as central server 112 for simplicity. Central server 112 and central database 111 may be communicatively coupled to receive information and data from network devices via network 140. Database 111 may record, store or otherwise contain therein data associated with a set of products and/or services that are available for sale at an e-commerce website hosted on a web server for pickup at one or more merchant's ASRSs including merchant's physical store 160.

Central server 112 may be configured to allow customers to place and pick up an online order of one or more items at ASRS 150 via network 140. Central server 112 may also conduct various types of payment transitions via different types of traditional payment networks related to credit and check cards and blockchain payment networks (not shown). A blockchain payment network may be coupled with network 140 via a third party service, and one or more mobile payment accounts linked with customer's credit card or debit card accounts.

Figure 2:
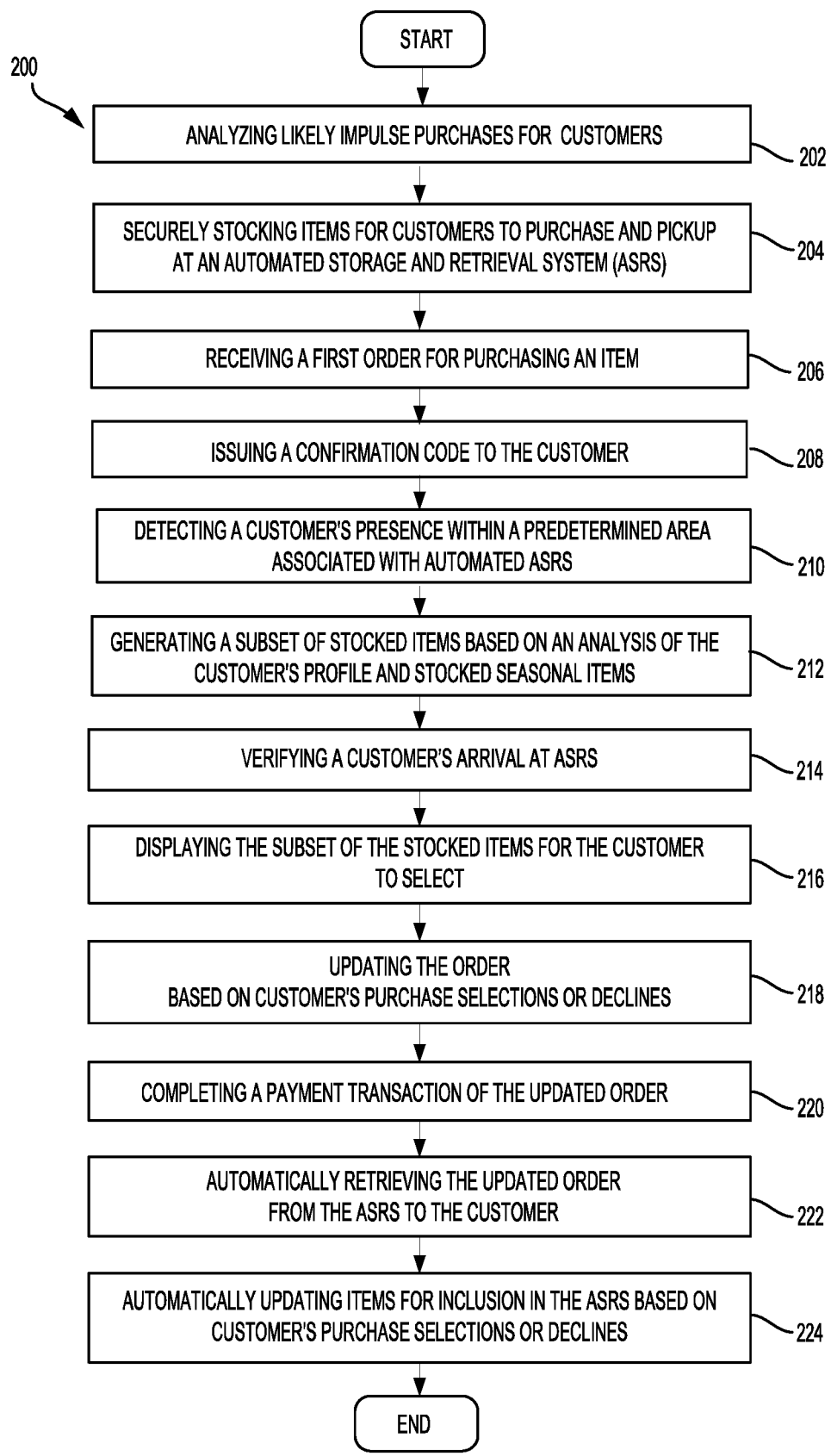
FIG. 2 is a flowchart diagram illustrating an example process for on-site purchases at an Automated Storage and Retrieval System (ASRS) in accordance to some example embodiments.

Platform 110 may include one or more computing devices for communicating with ASRS 150 via network 140 to execute one or more sets of processes shown in FIG. 2.

Customer 130 may create, via central server 112 and network 140, an account with platform 110 by creating a customer profile to store personal information and credentials of customer 130 in central database 111. Each customer profile may be configured to store data related to customer 130 including customer's username, password, email address, mobile phone number, shipping address, customer's preferences, payment transaction accounts, purchasing preferences, search history, purchase history, pending orders, other relevant demographic or analytical data, third parties including family members, friends, or neighbors, etc. Central database 111 may be configured to store profiles of a plurality of customers. Customer's payment transaction accounts may include one or more blockchain payment transaction accounts associated with blockchain payment networks, one or more credit card or debit card accounts associated with corresponding card payment networks, and one or more mobile payment accounts linked with customer's credit card or debit card accounts.

In an example embodiment, customer 130 may update and create the customer's profile via merchant's website, by accessing an application installed on a mobile device or by accessing an interactive touch screen terminal at ASRS 150. Customer's profile may be obtained by central server 112 from a collection of records of customer online behaviors related to online purchase transition history, search history via the merchant's website, and other sources related to customer preferences or predisposition to purchasing or using an item. For example, platform 110 may collect customer's online behaviors about how many times a customer has searched for particular items. Customer's preference data may include choices that customer 130 has made with respect to preferences or interests (e.g., highly likes, partially likes, dislikes, etc.) regarding one or more items in some categories.

Customer 130 may also request, create or generate one or more tasks, transactions or records in central database 111 with platform 110 via central server 112. A unique Quick Response (QR) code or other type of code may be generated for customer 130 via central server 112. The unique QR code may be read or accessed by computing devices (processors) in the interactive touchscreen terminal 153 for retrieving customer's pending orders.

When customer 130 places an online order, e.g., via customer mobile device 120, for one or more items via a merchant's website, customer 130 may select ASRS 150 from a plurality of ASRSs associated with the merchant to pick up the one or more items of the online order. The website may provide a plurality of pickup timeslots for customer 130 to select for picking up the one or more items of the online order at ASRS 150. A specified ASRS location or pickup timeslot may also be assigned for the customer.

ASRS 150 may include interactive touchscreen terminal 153, local processor 151, and memory 152. Local processor 151 may be configured to be in communication with memory 152 for implementing stored instructions.

Interactive touchscreen terminal 153 may include a touch screen display interface, a camera or scanner configured to read an order confirmation code, a QR code or other codes associated with customer 130. For example, upon arriving at ASRS 150, interactive touchscreen terminal 153 may quickly scan or read QR code to access customer's account and retrieve a pending order.

In some example embodiments, ASRS 150 may also include a conveying module (not shown). ASRS 150 may further include a conveyer belt and various mechanical components to secure, lock, load, and release all items stored in the ASRS. The conveying module is configured to load and release a purchased item to a door at the ASRS.

ASRS 150 may be stocked with a wide variety of likely impulse purchases determined for an entire body of customers during a given season in an area. ASRS 150 may act in concert with central server 112 to detect an incoming customer, verify a pending order, access customer's profile to retrieve customer's information including order history, search history and preferences, and generate a subset of stocked items based on an analysis of the customer's profile information. The example computing environment 100 may also include a wireless detection system (not shown) that is communicatively coupled to server 112 via network 140 for detecting customer's presence within a perimeter of geographic region around ASRS 150 and customer's arrival at ASRS 150. The wireless detection system may include a plurality of wireless communication devices each of which are configured to function as a wireless sensor. Each of the plurality of the wireless communication devices may be communicatively coupled to network 140 in a wired or wireless manner. The plurality of wireless communication devices may be disposed in and around a geographic region around ASRS 150, which may include a plurality of predefined locations. The plurality of wireless communication devices may be configured to form a geo-fence around ASRS 150 by forming a virtual perimeter around a geographic region of ASRS 150. Accordingly, one or more of wireless communication devices may wirelessly detect the presence of one or more mobile devices, e.g., a mobile device 120, within a perimeter of geographic region around ASRS 150. Once the customer's presence is detected, ASRS 150 may retrieve or stage the customer's order for delivery. The ASRS may also identify likely impulse buys to be offered to the customer.

Example computing environment 100 may also include a geolocation module (not shown). The geolocation module may be configured to receive geographic information about mobile device 120 from the wireless detection system via network 140. The received geographic information may be used by processors in central server 112 in determining the location of mobile device 120.

Any presently available technology and future-developed technology suitable for the purposes of geo-fencing and presence detection may be implemented in wireless communication devices. The perimeter of geographic region around ASRS 150 may be dynamically defined, e.g., by server 112 or the wireless detection system, on a periodic basis.

In some example embodiments, server 112 may trigger a timer at server 112, mobile device 120 or another computing device, to count down for a predetermined period of time, e.g., 5 minutes or another amount of time that is more or less than 5 minutes, upon determining that mobile device 120 is at least approximately at one of the predefined locations within the perimeter of geographic region around ASRS 150.

Upon detecting the presence of mobile device 120 within geographic region around ASRS 150, the wireless detection system may transmit information to server 112 to indicate the detection of the presence of mobile device 120. Server 112 may search database 111 to determine whether mobile device 120 is associated with any existing customer account. The geolocation module may perform one or more functions under the control of one or more processors in platform 110. Central server 112 may search central database 111 to determine whether there is a pending order for a customer's account associated with customer 130 in database 111 after geolocation module determines that customer 130 is within the predetermined area.

The central server 112 may transmit order information of the pending order to a local processor of ASRS 150. The order information may include one or more items in the pending order. In some example embodiments, the order information may further include at least one of: a pickup timeslot of the pending order, a customer order serial number (OSM) of the pending order, and a user identifier (ID) of customer 130.

If there is not a pending order for the customer's account, central server 112 may transmit advertisement information to customer 130. For example, server 112 may determine the advertisement information based on customer's profile. Customer 130 may select or disable an option to receive the advertisement information from central server 112 by updating customer's profile.

The distribution network 180 may communicate with ASRS 150, merchant's physical store 160, retailers outside ASRS management system 170, and merchant's inventory (not shown) via network 140 for delivering items to be stocked or ordered items to be picked up at ASRS 150.

FIG. 2 is a flowchart diagram illustrating an example process 200 for stocking ASRS 150 and on-site purchasing in accordance to an example embodiment. Although illustrated as discrete blocks, various blocks may be divided into additional blocks, combined into fewer blocks, or eliminated, depending on the desired implementation. Example process 200 may be implemented by the system shown in example computing environment 100 and may include the following steps.

In step 202, a processor at a merchant's platform 110 may first analyze and identify likely impulse purchases for a plurality of customers during a given season in an area. Likely purchases or impulse purchases for particular customers or groups of customers may also be identified. The likely impulse purchases may be associated with each customer's profile. The profile may comprise customer preferences, purchase history and search history via a merchant's website.

In step 204, ASRS 150 may be securely stocked with a wide variety of general and seasonal items and supplementary items selected by the processor based on the analysis of the likely impulse purchases for the plurality of customers.

In step 206, ASRS 150 may receive a first order from customer 130 for purchasing a first item via the merchant's website using different types of customer mobile device 120 via network 140. The items in the order may be provided to ASRS 150 if not already present there.

In step 208, a confirmation code may be issued via platform 110 and sent to customer 130, for example via a text or an email, for picking up the first order at the ASRS 150 within one or more assigned or selected pickup timeslots.

In step 210, a geolocation module in central server 112 may be configured to determine a customer's presence within a predetermined area associated with ASRS 150. The geolocation module may be configured to receive geographic information about mobile device 120 from the wireless detection system via network 140. The received geographic information may be used by processors in central server 112 in determining the location of mobile device 120.

In some example embodiments, a mobile application installed on a customer's mobile device 120 may also be configured to establish wireless communication via mobile device 120, with one or more of wireless communication devices when mobile device 120 is near and/or within the perimeter of geographic region around ASRS 150. One of wireless communication devices may determine the location of mobile device 120 based on wireless signals transmitted from mobile device 120 of customer 130. For example, upon visually seeing one or more of wireless communication devices functioning as visual beacon(s) or upon being prompted by the mobile application via a display of mobile device 120, customer 130 may operate the mobile application to cause mobile device 120 to transmit a signal. The signal may be received by one or more of wireless communication devices to indicate that the customer 130 (and mobile device 120) is within the perimeter of geographic region around ASRS 150.

In step 212, the server may generate, via one or more the processor, a subset of items based on an analysis of the customer's purchasing preferences, search history, purchase history, and the seasonal items. For example, if the customer has diabetes, a subset of stocked items may not include a list of candy. These particular items may be pre-stocked in ASRS 150 based on the analysis of the customer's purchasing preferences, search history, and purchase history. The items may also be located nearby ASRS for quick retrieval.

Customer 130 may find these particular items shown in a list of subset of stocked items in ASRS 150 when the customer visits ASRS 150 for picking up an order or only for a quick purchase of a particular item. When a day is close to a special day (e.g., Valentine's Day), a subset of stocked items may include gift cards, gift wrap, and related items for customer 130 to select.

In step 214, the process verifies a customer's arrival at ASRS 150. The arrival of customer 130 may be identified via a geo-location module on central server and/or geo-fencing application installed on customer's mobile device 120. In one example embodiment, when a geo-fencing information is not present, a code issued by merchant for pickup of an order may be used. When the code is presented by the customer at the ASRS, it is verified to correspond to the confirmation code issued to the customer via an interactive touchscreen terminal at the ASRS. Once confirmed, the customer's pending order is shown on the touch screen display interface of the ASRS. In one example embodiment, the QR code may be read or accessed for retrieving customer's pending orders.

In step 216, the subset of the stocked items may be displayed on interactive touchscreen terminal 153 for customer 130 to select and add to the first order.

In step 218, the first order may be updated automatically based on purchase selections by customer 130.

In step 220, customer 130 may be asked to select a payment method and confirm a payment transaction. The payment method may be selected based on the payment account information in the customer's profile. Accordingly, a payment transaction for the updated first order may be completed with a specified payment method selected by customer 130. The payment transaction may be one of: a credit card transaction, debit card transaction and a blockchain payment transaction.

In step 222, items included in the updated first order may be automatically retrieved from ASRS 150 via the conveying module of ASRS 150.

In step 224, the analysis of items for inclusion in the ASRS may be automatically updated by the central server based on the purchase selections or declines by the customer.

In some example embodiments, the method 200 may further comprise accessing and displaying the customer's order on the interactive touchscreen terminal 153 once the confirmation code for the order is verified.

In some example embodiments, detecting the customer's arrival further comprises identifying a geographic information of a mobile device associated with the customer by the geolocation module on central server 112. Once the customer's presence is detected nearby the ASRS 150, central server 112 may search central database 111 to identify a customer's account and access the customer's profile associated with the customer's account in order to determine whether there is a pending order associated with the customer. If there is a pending order for the customer associated with the customer account, central server 112 may transmit the customer's pending order information to local processor 151 in ASRS 150. Local processor 151 may be configured to facilitate having ordered items ready for retrieving from ASRS 150. At the same time, platform 100 may send messages, e.g. push notifications, to the customer and ask whether the customer is ready to pick up the order.

In some example embodiments, the customer's profile may be updated with new purchases and new search records. In some example embodiments, the subset of stocked items may comprise a plurality of overlapping items between items associated with the customer's profile and the stocked seasonal items. In one example embodiment, the subset of stocked items may comprise items related to the first item ordered by the customer and similar items purchased or searched for by other customers.

In some example embodiments, prepayment may be required before items are stocked in the ASRS. For example, ASRS 150 may require payment before securely stocking high shrink or fragile items including cell phones, TVs, computers, etc. For example, a new expensive cell phone may be distributed and stocked in ASRS 150 after platform 110 receives a payment from customer 130. That is, the new expensive cell phone must be pre-paid in order to receive a confirmation code for pickup at ASRS 150.

In some example embodiments, a customer may access a mobile application installed on his mobile device to check for the availability of a particular item in a merchant's ASRS by specifying a particular location. The application may also show ratings or reviews for other retails' stores carrying the same items. A customer may search and order an item through a merchant's website or other retailer websites and have the ordered item delivered to a specified ASRS 150. Once the item is delivered to ASRS, platform 110 may send an email or text with a plurality of pickup timeslots to the customer for pickup. Central server 112 may determine and identify what the customer has already purchased and send out a text or an email to the customer. The text or email may indicate that the ordered items are ready for pickup at the ASRS within a plurality of pickup timeslots.

In some example embodiments, customer 130 may pre-order one or more items for pickup at ASRS 150 without a payment. Upon arriving at ASRS 150, customer 130 may refer to a subset of stocked items offered by ASRS 150 or conduct separate impulse searches for other items they may think about to purchase. The customer may update their purchase list by adding some new stocked items or removing some pre-ordered items. For example, customer 130 orders a TV for picking it up at ASRS 150. Customer 130 may have searched for an extra TV controller or a TV table but have not placed the related order via the merchant's website. Upon customer 130's arrival at ASRS 150 for picking up the order, central server 112 may generate a subset of items including the TV table or the controller to be presented on interactive touchscreen terminal 153. Customer 130 may quickly purchase the TV controller or the TV table while picking up the ordered TV at ASRS 150.

In some example embodiments, customer 130 may browse a retail website outside platform 110, e.g., a local electrical store, order items, pay electronically, and request the item to be delivered to ASRS 150 through distribution network 180.

In some example embodiments, central server 112 may receive geographic information about customer 130. For example, server 112 may receive the geographic information by utilizing a global positioning system (GPS) on user device 120. The geographic information may indicate that customer 130 is within a predetermined area associated with ASRS 150. The predetermined area may be determined based on a location of ASRS 150. Central server 112 may then determine whether there is a pending order for a customer profile associated with customer 130 in central database 111. If there is a pending order for the customer account, server 112 may transmit order information for the pending order to a local computing device of physical store 160 to prepare transactions and delivery.

In some example embodiments, for a given local population, platform 100 may generate a plurality of assortments that cover the local impulse purchases and/or a season of the year. For example, the platform may stock 10 assortments in the local ASRSs by using sales history statistics and search records in that area during the season of the year for the personal demographic. The assortments may include a subset of stocked items for a customer who has a pending order for pickup or searches for buying a particular item from the ASRS. The assortments may be presented on shelves inside the ASRS for the customer to check in and make a quick purchase using the customer's mobile device, e.g. smart phone.

Before the customer checks in and walks into the ASRS, customer's mobile device 120 has installed a merchant application linked to the customer's merchant account. The customer may enable a function in the merchant account to receive a message from the merchant platform. For example, when a customer is proximate the ASRS, the platform may send a message and ask if the customer would like to check out assortments at the ASRS. The message may include the generated subset of stocked items for the customer. When the customer arrives at the ASRS, the customer may check in using the interactive touch screen terminal or other similar terminals to read or scan the unique QR code associated with the customer's account.

In some example embodiments, after the customer walks into the ASRS, the customer may be provided one or more totes to place the selected items. The items presented on shelves may be tracked by weight sensors and based on video analytics of data collected by a plurality of cameras installed in the ASRS. The items may also be tracked using radio-frequency identification (RFID) associated with the items. The weight sensors may help to determine when the items are removed or placed back on the shelf. For example, if the customer takes an item off the shelf and put it in the tote or in the customer's pocket, it may be added to the customer's virtual shopping cart in the mobile application. If the customer places the item back on the shelf, it may be removed out of the virtual shopping cart. The plurality of cameras may be used to recognize the customer as well as the customer's location or proximity to shelves and items so that the customer's virtual shopping cart is updated appropriately.

When the customer takes the items and leaves the ASRS, the merchant application may charge the customer's account for the items, and an electronic receipt may be sent to the customer via a message and saved in the customer's account for review. The ASRS may recycle and replenish the presented assortments based on the changes of the presented assortments and sales record in the ASRS.

In some example embodiments, the tote returned by the customer may be recycled within the ASRS and/or go via a conveyer to be restocked by automation, and then reinserted into the ASRS via a rear access door of the ASRS.

In some example embodiments, the ASRS may present items to provide item samples and corresponding complete items or products for sale.

When the customer visits the ASRS, the customer may have a flexible schedule to pick up a pending order to be retrieved from the ASRS and check in the ASRS for a quick purchase. In some example embodiments, after a period of a pickup timeslot when the customer's presence is detected but the customer does not pick up a pending order, the platform may send a reminder message and ask if the customer is ready to pick up the order. If the customer replies "I am ready", the ASRS may have the pending order ready for retrieve.

Figure 3:
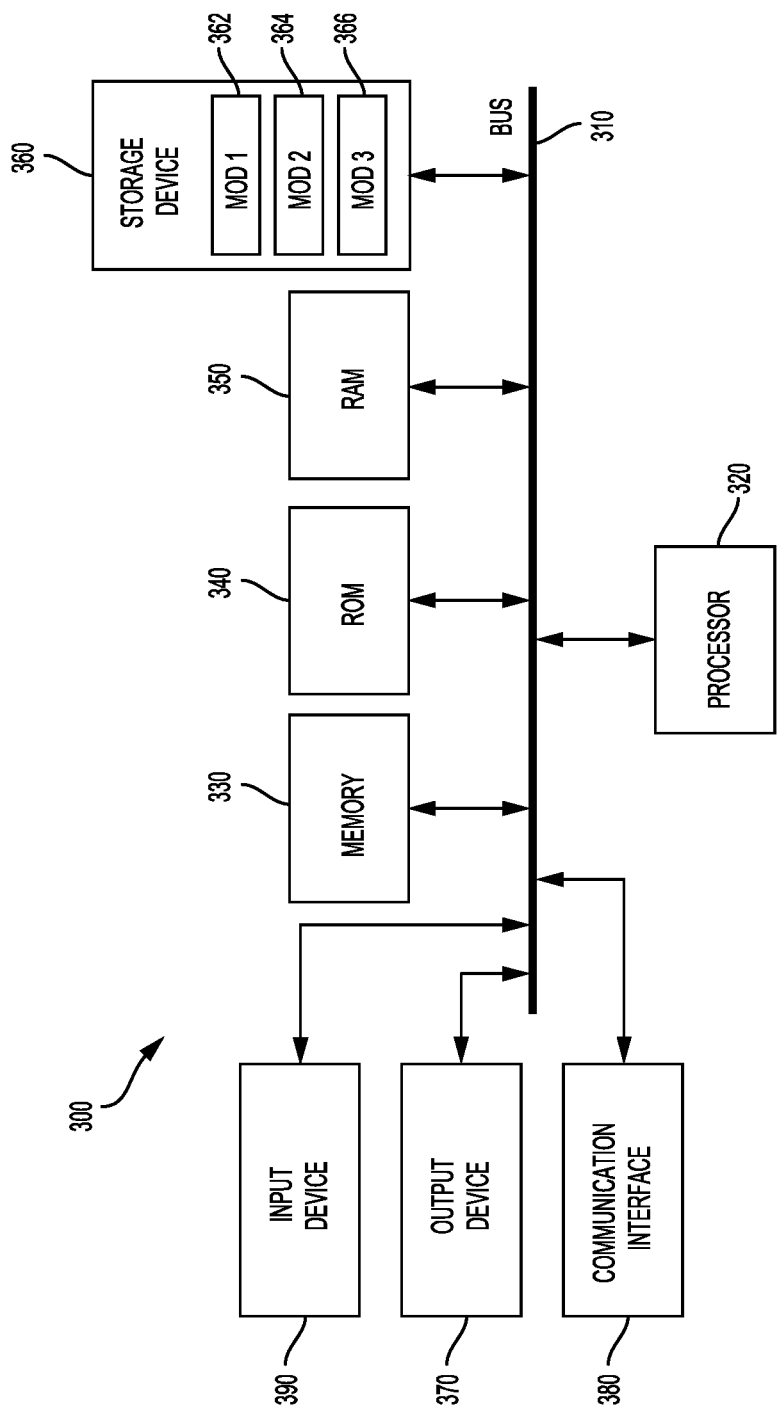
FIG. 3 is a block diagram an example computer system in which some example embodiments may be implemented.

FIG. 3 illustrates an example computer system 300 which can be used to perform the processes for storing items in customer owned product storages at an ASRS as disclosed herein.

With reference to FIG. 3, an example system 300 can include a processing unit (CPU or processor) 320 and a system bus 310 that couples various system components including the system memory 330 such as read only memory (ROM) 340 and random access memory (RAM) 350 to the processor 320. The system 300 can include a cache of high speed memory connected directly with, in close proximity to, or integrated as part of the processor 320. The system 300 copies data from the memory 330 and/or the storage device 360 to the cache for quick access by the processor 320. In this way, the cache provides a performance boost that avoids processor 320 delays while waiting for data. These and other modules can control or be configured to control the processor 320 to perform various actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general purpose processor and a hardware module or software module, such as module 1 362, module 2 364, and module 3 366 stored in storage device 360, configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drives and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, bus 310, output device 370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 300 is a small, handheld computing device, a desktop computer, or a computer server.

Although the example embodiment described herein employs the hard disk 360, other types of computer-readable media which can store data that are accessible by a computer, such as magnetic cassettes, flash memory cards, digital versatile disks, cartridges, random access memories (RAMs) 350, and read-only memory (ROM) 340, may also be used in the example operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A computer-implemented method, comprising
    determining a plurality of items for an automated storage and retrieval system (ASRS) based on sales history statistics and search records of a plurality of customers in a predetermined area associated with the ASRS and during a given season of a year;
    determining common items to stock in the ASRS, the common items include items of the plurality of items that are common amongst purchases made by the plurality of customers for the given season of the year;

stocking the common items in the ASRS;

receiving, by the processor, a first order from a customer of the plurality of the customers for purchasing a first item stocked at the ASRS, wherein the order is received after stocking the common items in the ASRS;

issuing, by the processor, a confirmation code to the customer via a text or an email for picking up the order;

detecting, via a geolocation module in a central server, the customer's presence within the predetermined area associated with the ASRS;

generating, by the processor, a subset of the common items stocked in the ASRS based on an analysis of potential impulse purchases associated with the customer, the subset of the common items includes a plurality of overlapping items between the potential impulse purchases associated with the customer and the common items, wherein the potential impulse purchases are associated with the customer based on the customer's purchasing preferences, search history, and purchase history;

verifying the customer's arrival at the ASRS;

displaying the subset of the common items for the customer to select for purchase, updating, by the processor, the order based on purchase selections or declines by the customer;

completing a payment transaction of the updated order;

automatically retrieving the updated order from the ASRS to the customer; and automatically, by the processor, updating the items for inclusion in the ASRS based on the purchase selections or declines by the customer.

2. The method of claim 1, wherein a central server and a central database are configured to create and store profiles associated with the plurality of the customers.

3. The method of claim 1, further comprising:

in response to a verification of a customer's arrival at the ASRS, displaying the customer's pending order on an interactive touchscreen terminal.

4. The method of claim 1, wherein the customer's profile is updated with new preference, new purchases, and new searches recorded at the platform by the central server.

5. The method of claim 1, wherein the subset of common items comprises a plurality of overlapped items between items associated with the customer's profile and the common items.

6. The method of claim 1, wherein the subset of common items further comprises items related to the purchased item ordered by the customer and items purchased or searched by other customers.

7. The method of claim 1, wherein the detecting the customer's arrival further comprises:

identifying, by a geo-fencing application installed on a mobile device and on a central server, a geographic information of a mobile device associated with the customer;

searching the central database to identify a customer's account associated with the identified mobile device; and accessing the customer's profile associated with the customer's account in order to determine whether there is a pending order associated with the customer.

8. The method of claim 7, further comprising:

in response to a determination that there is the pending order associated with the customer account, transmitting the customer's pending order information and the subset of the common items to a local processor at the ASRS via the central server.

9. A system, comprising:

an automated storage and retrieval system (ASRS);

a processor;

a non-transitory computer-readable storage medium having instructions stored which, when executed by the processor, cause the processor to perform operations comprising:

determining a plurality of items for an automated storage and retrieval system (ASRS) based on sales history statistics and search records of a plurality of customers in a predetermined area associated with the ASRS and during a given season of a year;

determining common items to stock in the ASRS, the common items include items of the plurality of items that are common amongst purchases made by the plurality of customers for the given season of the year;

stocking the common items in the ASRS;

receiving, by the processor, a first order from a customer of the plurality of the customers for purchasing a first item stocked at the ASRS, wherein the order is received after stocking the common items in the ASRS;

issuing, by the processor, a confirmation code to the customer via a text or an email for picking up the first order;

detecting, via a geolocation module in a central server, the customer's presence within the predetermined area associated with the ASRS;

generating, by the processor, a subset of the common items stocked in the ASRS based on an analysis of potential impulse purchases associated with the customer, the subset of the common items includes a plurality of overlapping items between the potential impulse purchases associated with the customer and the common items, wherein the potential impulse purchases are associated with the customer based on the customer's purchasing preferences, search history, and purchase history;

verifying the customer's arrival at the ASRS;

displaying the subset of the common items on the interactive touchscreen terminal for the customer to select;

updating, by the processor, the first order based on purchase selections or declines by the customer;

completing a payment transaction of the updated first order;

automatically retrieving the updated first order from the ASRS to the customer; and automatically, by the central server, updating the items for inclusion in the ASRS based on the purchase selections or declines by the customer.

10. The system of claim 9, wherein a central server and a central database at the platform are configured to create and store profiles associated with the plurality of the customers.

11. The system of claim 9, further comprising:

in response to a verification of a customer's arrival at the ASRS, displaying the customer's pending order on the interactive touchscreen terminal.

12. The system of claim 9, wherein the customer's profile is updated with new preference, new purchases, and new searches recorded at the platform by the central server.

13. The system of claim 9, wherein the subset of the common items comprises a plurality of overlapped items between items associated with the customer's profile and the stocked common items.

14. The system of claim 9, wherein the stocked common items further comprise a second item pre-paid by a customer for pickup at the ASRS, the second item being purchased via the platform or a retail store outside the platform and being delivered to the ASRS through a distribution network.

15. The system of claim 9, wherein the subset of the common items further comprises items related to the first item ordered by the customer and items purchased or searched by other customers.

16. The system of claim 9, wherein the detecting the customer's arrival further comprising:
identifying, by the geolocation module on a central server, a geographic information of a mobile device associated with the customer;
searching the central database to identify a customer's account associated with the identified mobile device; and
accessing the customer's profile associated with the customer's account in order to determine whether there is a pending order associated with the customer.

17. The system of claim 16, further comprising:
in response to a determination that there is the pending order associated with the customer account, transmitting the customer's pending order information and the subset of the common items to a local processor at the ASRS via the central server.

18. A non-transitory computer-readable storage medium having executed instructions stored which, when executed by a processor, cause the processor to perform operations comprising:
determining a plurality of items for an automated storage and retrieval system (ASRS) based on sales history statistics and search records of a plurality of customers in a predetermined area associated with the ASRS and during a given season of a year;
determining common items to stock in the ASRS, the common items include items of the plurality of items that are common amongst purchases made by the plurality of customers for the given season of the year;
stocking the common items in the ASRS;
receiving, by the processor, a first order from a customer of the plurality of the customers for purchasing a first item stocked at the ASRS, wherein the order is received after stocking the common items in the ASRS;
issuing, by the processor, a confirmation code to the customer via a text or an email for picking up the first order;
detecting, via a geolocation module in a central server, the customer's presence within the predetermined area associated with the ASRS;
generating, by the processor, a subset of the common items stocked in the ASRS based on an analysis of potential impulse purchases associated with the customer, the subset of the common items includes a plurality of overlapping items between the potential impulse purchases associated with the customer and the common items, wherein the potential impulse purchases are associated with the customer based on the customer's purchasing preferences, search history, and purchase history;
verifying the customer's arrival at the ASRS;
displaying the subset of the common items on an interactive touchscreen terminal for the customer to select;
updating, by the processor, the first order based on purchase selections or declines by the customer;
completing a payment transaction of the updated first order;
automatically retrieving the updated first order from the ASRS to the customer; and
automatically, by the central server, updating the items for inclusion in the ASRS based on the purchase selections or declines by the customer.

19. The non-transitory computer-readable storage medium of claim 18, wherein the subset of common items further comprise items related to the first item ordered by the customer and items purchased or searched by other customers.

* * * * *